US009436603B1

(12) United States Patent
Pohlack (10) Patent No.: US 9,436,603 B1
(45) Date of Patent: Sep. 6, 2016

(54) DETECTION AND MITIGATION OF TIMING SIDE-CHANNEL ATTACKS

(71) Applicant: Amazon Technologies, Inc., Reno, NV (US)

(72) Inventor: Martin Thomas Pohlack, Dresden (DE)

(73) Assignee: Amazon Technologies, Inc., Reno, NV (US)

( * ) Notice: Subject to any disclaimer, the term of this patent is extended or adjusted under 35 U.S.C. 154(b) by 162 days.

(21) Appl. No.: 14/192,480

(22) Filed: Feb. 27, 2014

(51) Int. Cl.
*G06F 12/02* (2006.01)
*G06F 12/08* (2016.01)

(52) U.S. Cl.
CPC ................................ *G06F 12/0808* (2013.01)

(58) Field of Classification Search
None
See application file for complete search history.

(56) References Cited

U.S. PATENT DOCUMENTS

| | | |
|---|---|---|
| 2003/0044003 A1 | 3/2003 | Chari et al. |
| 2008/0022102 A1 | 1/2008 | Venkatesan et al. |
| 2010/0332578 A1 | 12/2010 | Gopal et al. |
| 2013/0007881 A1 | 1/2013 | Liem et al. |
| 2013/0301826 A1 | 11/2013 | Gueron et al. |
| 2014/0059688 A1 | 2/2014 | Margalit |

OTHER PUBLICATIONS http://en.wikipedia.org/wiki/Kernel_SamePage_Merging_%28KSM%29, Kernel SamePage Merging (KSM), Wikipedia, updated Sep. 16, 2013, downloaded Feb. 28, 2014, pp. 1-2.
Yuval Yarom and Katrina Falkner, "Flush+Reload: a High Resolution, Low Noise, L3 Cache Side-Channel Attack," Cryptology ePrint Archive, Report 2013/448, Jul. 18, 2013, pp. 1-9.
U.S. Appl. No. 14/715,333, filed May 18, 2015, Martin Thomas Pohlack.
U.S. Appl. No. 14/715,345, filed May 18, 2015, Martin Thomas Pohlack.

*Primary Examiner* — Charles Rones
*Assistant Examiner* — Ryan Dare
(74) *Attorney, Agent, or Firm* — Robert C. Kowert; Meyertons, Hood, Kivlin, Kowert & Goetzel, P.C.

(57) ABSTRACT

During execution of an application that accesses a shared memory, a security component may, based on an indication from a performance monitor, determine that the application is carrying out a timing side-channel attack. The performance monitor may trigger an interrupt if a pre-determined number of cache line flushes is executed, after which the security component may inspect program instructions of the executing application to determine whether those instructions are likely being used in such an attack. In response to determining that an attack is under way, the security component may take action to mitigate or curtail the attack. The security component may modify the program instructions or page mapping of the executing application to make accesses to portions of the shared memory targeted by the cache line flushes predictable or consistent (e.g., by replacing the instructions with traps, removing them, or inserting instructions immediately before or after them).

19 Claims, 7 Drawing Sheets

DETECTION AND MITIGATION OF TIMING SIDE-CHANNEL ATTACKS

BACKGROUND

The advent of virtualization technologies for commodity hardware has provided benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In virtualized computing environments and in local computing systems, system resources, including physical memory pages, are sometimes shared between processes or applications executing in the system. For example, in a local system, malicious applications that attempt to spy on other executing processes or applications might share physical memory pages with those other processes or applications by means of a shared library. In a virtualized environment, malicious applications might share physical memory pages with a targeted process or application by means of Kernel SamePage Merging (KSM), in which identical memory pages are shared between different processes or applications (and, in some cases, users).

By measuring the timing of accesses to main memory on shared pages, a malicious application can be used to detect whether a target memory area resides in a cache. This cache residency can be correlated with recent usage of data in the memory area in the system by one of the processes or applications that shares access to the target memory area. An attacking program can continuously flush relevant memory areas from the caches in the system and observe the timing of accesses to those memory areas, thereby monitoring the behavior of a target program. Such attacks are sometimes referred to as timing side-channel attacks.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems and methods described herein may be used to detect, prevent, mitigate, and/or curtail timing side-channel attacks in virtualized computing systems and/or in local (single) systems in which physical memory pages are shared between processes, applications, and/or users. In various embodiments, a security component of an operating system, hypervisor, or virtual machine monitor may use one or more performance monitors (e.g., hardware performance counters or other performance monitoring mechanisms) to detect the execution of cache line flush type instructions (such as the CLFLUSH instruction of the x86 instruction set) in the context of shared physical pages and timing side-channel attacks, and may take action to mitigate or curtail those attacks and/or to prevent subsequent attacks on a target process or application.

As described in more detail herein, during execution of a process or application that accesses shared physical memory pages, a security component may, based on an indication from a performance monitor, determine that the process or application is carrying out a timing side-channel attack targeting another process or application that accesses the shared physical memory pages. For example, in some embodiments, a performance monitor may trigger an interrupt if a pre-determined number of cache line flush type instructions are executed. The security component (or an interrupt handler thereof that is invoked in response to the triggered interrupt) may then inspect the program instructions of the application that includes the cache line flush type instructions to determine whether those instructions are likely being used in a timing side-channel attack.

In response to determining that an attack is likely under way, the security component (or interrupt handler thereof)

may take action to mitigate or curtail the attack. For example, in some embodiments, the security component (or interrupt handler thereof) may modify the program instructions or page mapping of the suspected attacking process or application to make accesses to portions of the shared memory targeted by the cache line flush type instructions (e.g., accesses to portions of the shared memory that are targeted for removal from a cache by the cache line flush type instructions) predictable or consistent, thereby removing the ability of the suspected attacker to determine whether another (target) process or application is accessing those portions of the shared memory. In various embodiments, the actions taken by the security component may include replacing the cache line flush type instructions of the suspected attacking process or application with trap type instructions, removing the cache line flush type instructions from the suspected attacking process or application, or inserting instructions immediately before or after the cache line flush type instructions from the suspected attacking process or application to change the behavior of the suspected attacking process and/or the timing behavior of accesses to the targeted portions of the shared memory.

In general, the term "side-channel" may refer to a channel of information flow in a computing system that was not intended for the use of processes or applications executing in the system, e.g., a channel of information flow that is not programmed explicitly by the operating system, but that can be opened in some systems in which shared resources are used. For example, in one type of timing side-channel attack, there may be at least two parties involved, the observation target and the observer (i.e., the attacker). These two parties may share system resources, including one or more processors (CPUs) and main memory, and as a consequence, they may both use the cache hierarchy that sits between the CPU(s) and main memory.

In such a timing side-channel attack, the attacking process or application may monitor the access times to various memory areas in order to determine whether a particular area of memory was in the cache before the attacking process or application accessed the particular memory area (e.g., before the attacker queried one or more locations in the particular memory area using a read or load type instruction) or whether it had to be fetched from main memory. In this case, the side-channel is a timing side-channel that allows the attacker to glean information about a target process or application by determining how long it takes to read or to write to particular memory locations. In this example, the attacker may also modify the side-channel, e.g., by clearing the cache selectively or fully using a cache line flush type instruction, if available. For example, the CLFLUSH instruction of the x86 instruction set can be used in any context (including in user applications) and can be used to remove all memory areas that are associated with a virtual address that is a parameter of the instruction from the cache hierarchy (i.e., to flush the cache lines corresponding to those memory areas from all memory caches). In other words, in order to remove the contents of a particular memory from the cache, a process or application may pass one or more addresses associated with the particular memory area to a CLFLUSH instruction or another similar cache line flush type instruction. The execution of the cache line flush type instruction may, in the hardware of the processor, clear all of the corresponding cache lines and move their contents back to memory, such that when and if a process or application subsequently attempts to access them, they will have to be fetched from main memory. Because fetching information from main memory takes much longer than fetching that same information from cache (e.g., on the order of several hundred cycles compared with a single digit number of cycles for information resident in a level 1 cache), an attacking program that accesses the particular memory area after flushing its contents from the cache may be able to distinguish whether another process or application has accessed the particular memory area between the time that the cache line flush type instruction was executed by the attacking program and the time the attacking program subsequently accesses the particular memory area. Note that the CLFLUSH instruction is not a privileged instruction and does not trap. Therefore, it cannot easily be virtualized or disabled to prevent or slow down the attack.

In many (if not most) modern operating systems, there is a lot of code that is not directly linked into the program itself but resides in shared libraries. In general, it would be wasteful to include the code in main memory multiple times, especially portions of the code that are not modified. For example, the shared code itself (if not also the data) may typically be mapped in read-only mode. Therefore, only one physical copy of the shared code may need to be maintained in main memory. The physical memory pages that contain the shared code may be mapped into the different processes executing in the system using different virtual addresses. However, since the physical memory pages are shared, whenever a program A executes a cache line flush type instruction to flush a certain memory area from the cache, this has an effect on the physical page (and/or on the copies of the physical page that the cache holds). In other words, the cache line flush type instruction will flush the contents of the cache to the one and only copy of the code in physical memory, and the effect of the cache line flush type instruction can be seen in all the other programs that map in the same shared memory area.

In one example of a timing side-channel attack, an attacking program maps in the same code that is used by an encryption program and then starts to selectively flush certain areas of the code from the cache and to measure the time it takes to read those memory areas back (e.g., it executes multiple cache line flush type instructions, each followed by a read or load type instruction). In this example, by observing the timing of the read or load type instructions, the attacking program can determine whether another process or application has used (or is currently using) various portions of the code (e.g., to determine if particular code paths or branches are being taken). Using this approach, the attacking program may be able to determine what the encryption program is doing by observing which code paths or branches it takes. For example, if the attacking program determines that a target program executed branch A, and the attacking program knows the specific value of a branch condition that leads to this branch being taken, it may be able to draw conclusions about the data that is being processed by the target program. In this example, such an attack may be used to extract cryptographic keys from the target program.

Note that some systems that implement virtualization include a same page sharing feature (e.g., implemented by the hypervisor). In such systems, sharing of physical pages may not only be happening within one virtual machine, but may be propagated throughout the whole system. For example, the hypervisor may scan the contents of physical memory pages, and whenever it finds the same pages, it may merge them into a single copy maintained under the root, re-directing references to that page from multiple guests to the single copy. In such systems, a side-channel attack may not only be implemented within a single guest but across guests.

Figure 1:
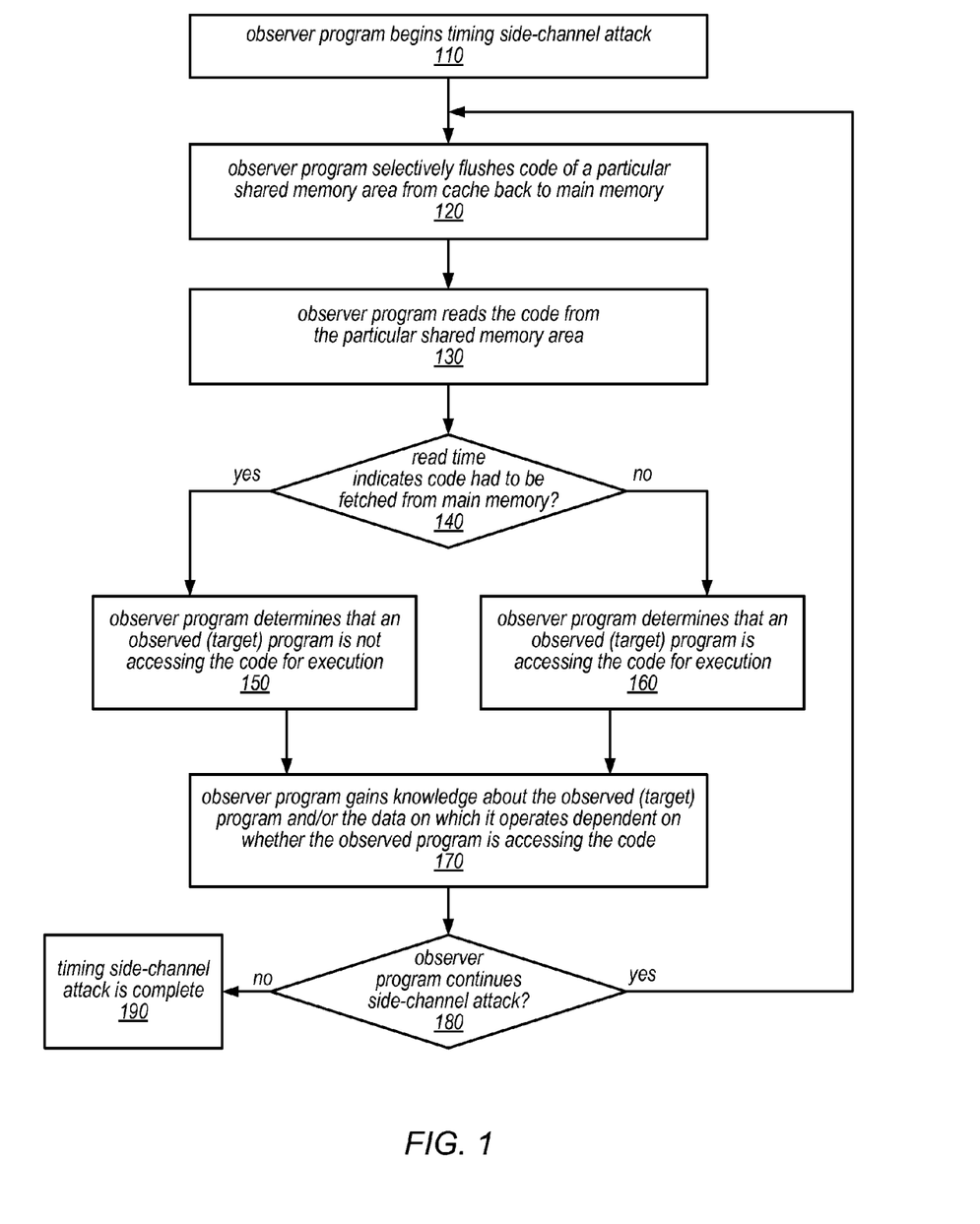
FIG. 1 is a flow diagram illustrating one example of a timing side-channel attack that may be detected, prevented, mitigated, and/or curtailed using the techniques described herein.

One example of a timing side-channel attack that may be detected, prevented, mitigated, and/or curtailed using the techniques described herein is illustrated by the flow diagram in FIG. 1. As illustrated in this example, an observer program begins a timing side-channel attack (as in 110), and selectively flushes the code of a particular shared memory area from a cache back to main memory (as in 120). The observer program then reads the code (i.e., the code that it flushed from the cache) from the particular shared memory area, as in 130.

If the read time indicates that the code did not have to be fetched from main memory (e.g., that it had been read back into the cache since it was flushed from the cache by the observer program), the observer program determines that an observed (target) program is currently and/or frequently accessing the code in that particular shared memory area for execution. This is illustrated in FIG. 1 by the negative exit from 140 and 160. On the other hand, if the read time indicates that the code had to be fetched from main memory (e.g., that it had not been read back into the cache since it was flushed from the cache by the observer program), the observer program determines that the observed (target) program is not currently or frequently accessing the code in that particular shared memory area for execution. This is illustrated in FIG. 1 by the positive exit from 140 and 150.

In either case, the observer program gains knowledge about the observed (target) program and/or the data on which it operates dependent on whether or not the observed program is currently and/or frequently accessing the code in the particular shared memory area, as in 170. In other words, the observer program is able to infer something about the observed (target) program and/or the data on which it operates dependent on whether or not the observed program has recently executed or is currently executing particular portions of the code (e.g., code on particular code paths or branches). If the observer program is continuing its side-channel attack (shown as the positive exit from 180), the operations illustrated at 120 to 170 are repeated, possibly targeting different shared memory locations, as the observer program attempts to gain more knowledge about the observed (target) program and/or the data on which it operates. This is illustrated in FIG. 1 by the feedback from the positive exit of 180 to 120. If the observer program is not continuing its side-channel attack (or once the observer program completes its attack using multiple iterations of the operations illustrated in FIG. 1), the timing side-channel attack is complete. This is illustrated in FIG. 1 by the negative exit from 180 and 190.

As previously noted, a cache line flush type instruction used by an attacking program in carrying out a timing side-channel attack (e.g., the CLFLUSH instruction of the x86 instruction set) may not trap and may not be restricted in terms of its use by users (e.g., clients or guests) and/or by privileged processes (e.g., operating system kernels, hypervisors, or virtual machine monitors) land. Therefore, there may be no hardware mechanisms available that can be used to effectively filter for this instruction (i.e., to limit or restrict its use). However, the techniques described herein may in some embodiments be used to emulate a trap on a cache line flush type instruction and, consequently, to detect, prevent, mitigate, and/or curtail this type of timing side-channel attack.

In some embodiments, the processors in the system (i.e., the CPUs), or another unit in the system (e.g., a performance monitor unit, or PMU) may contain some facilities to monitor the behavior of the CPUs at runtime. For example, in some embodiments, the CPUs or PMUs may include various performance counters from which statistics about various behavioral aspects of the system can be obtained. In some embodiments, the processors may include a specific (dedicated) performance counter that counts the number of occurrences of a cache line flush type instruction (e.g., the number of times that the CLFLUSH instruction is executed). In some embodiments, such counters may be configured (e.g., programmed) in such a way so that they trigger an interrupt after a pre-determined number of occurrences has been detected. In such embodiments, this may invoke an interrupt handler that is configured to determine whether the cache line flush type instructions are being executed as part of a timing side-channel attack and, if so, to take action to mitigate the effects of the attack or to curtail the attack. For example, in response to an interrupt being triggered by a performance counter that counts cache line flushes, an executing program (e.g., a security component of the operating system) may be trapped into the kernel hypervisor (or another component that is controlling the PMU). At that point, it may be able to obtain information about the portion of the suspected attacking program (e.g., by inspecting the code in the neighborhood of the detected cache line flush type instructions) and/or take appropriate action. As described in more detail herein, in response to determining that the detected cache line flush type instructions are likely being executed as part of a timing side-channel attack, the security component may be configured to modify the program instructions of the process or application that included the detected cache line flush type instructions (e.g., patching the process or application to replace native-code representations of these instructions with native-code representations of other instructions) and/or modifying the page mapping of the process or application that included the detected cache line flush type instructions.

Note that in some embodiments, a CPU may include more and/or different types of performance counters, such as those that are (or can be) configured to observe and/or count cache misses, cache hits, certain cache refill pattern (e.g., when a level 2 cache line is refilled from a level 3 cache), or other conditions that could trigger an interrupt in the case that a process or application executes a collection of cache line flush type instructions and/or other instructions.

In various embodiments, any of these performance counters may be employed as a weak trapping mechanism. For example, in some embodiments, the threshold at which one of these performance counters triggers an interrupt may be set very low (e.g., to one), leading to nearly synchronous interrupts following cache line flushes in the system, and allowing the system to quickly initiate counter measures. In other words, by configuring the performance counter to trigger an interrupt after a single occurrence of a cache line flush type instruction (or of other condition that indicates the execution of a cache line flush type instruction), a security component in the system may emulate trapping on a cache line flush type instruction. Note that although these performance counter traps are taken after the fact (i.e., after the cache line flush instruction has been executed rather than prior to executing this instruction, as would typically be the case when trapping on a prohibited or instruction), since a timing side-channel attack is statistical in nature (i.e., since it typically relies on the execution of a large number of cache line flush type instructions), it may be acceptable to receive an indication that one or more cache line flush instructions have been executed after the fact. In various embodiments, the threshold for the number of occurrences of a cache line flush or other condition that triggers an interrupt may be set to different values to allow for a tradeoff between high system overhead due to excessive amounts of interrupts and synchronicity of the detection of a potential threat. For example, when using a performance counter that does not directly target cache line flush type instructions (e.g., one that does not count occurrences of cache line flush type instructions, but counts occurrences of other conditions that may indirectly indicate the execution of cache line flush type instructions), this trade-off may result in setting the threshold higher than when using a performance counter that directly counts occurrences of cache line flush type instructions. In general, the techniques described herein for detecting, preventing, mitigating, and/or curtailing a timing side-channel attack may include programming one or more performance counters to trigger an interrupt in response to detecting any condition indicative of the execution of a cache line flush type instruction.

Figure 2:
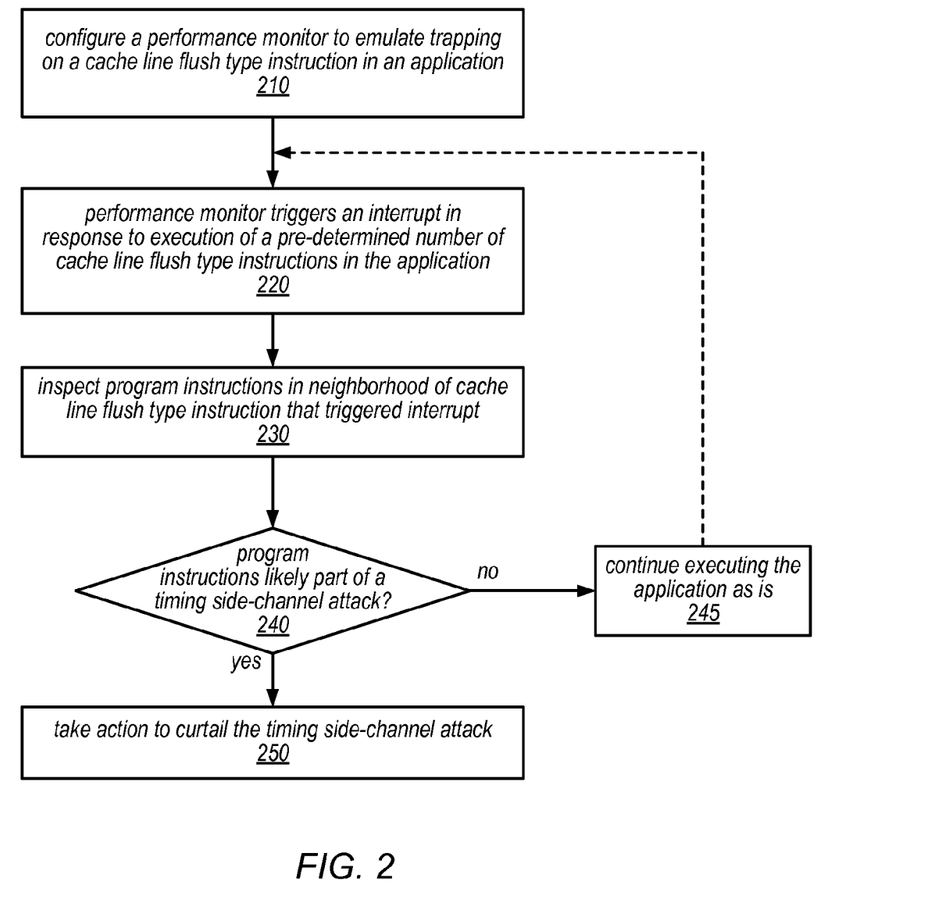
FIG. 2 is a flow diagram illustrating one embodiment of a method for detecting and/or mitigating a timing side-channel attack using a performance monitor.

One embodiment of a method for detecting and/or mitigating a timing side-channel attack using a performance monitor is illustrated by the flow diagram in FIG. 2. As illustrated at 210, in this example, the method may include configuring a performance monitor to emulate trapping on a cache line flush type instruction in an application. For example, the method may include configuring a hardware performance monitor to trigger an interrupt after a pre-determined number of cache line flush type instructions have been executed (e.g., flushes from a cache to main memory, or flushes or corresponding refills between different levels in the cache hierarchy). Note that while several examples herein describe the use of hardware performance monitor mechanisms (such as hardware performance counters) to detect or infer the execution of cache line flush type instructions and to trigger a corresponding action, in other embodiments, occurrences of cache line flushes may be detected or inferred (and/or corresponding actions may be taken) by software performance monitor mechanisms or using a combination of hardware and software mechanisms. As illustrated in this example, the method may include the performance monitor triggering an interrupt in response to execution of a pre-determined number of cache line flush type instructions in the application, as in 220. As described above, the interrupt may be triggered after a single occurrence of a cache line flush type or after multiple cache line flushes, depending on the number and/or type of performance monitors that are available, the overhead that can be tolerated by the applications, and/or other criteria.

As illustrated in FIG. 2, the method may also include inspecting the program instructions in the neighborhood of the cache line flush type instruction that triggered the interrupt, as in 230, in order to determine whether the program instructions that triggered the interrupt are likely to be part of a timing side-channel attack (e.g., to determine the root cause of the interrupt and/or use of the cache line flush type instructions), as in 240. For example, in response to the interrupt, the method may include invoking (or jumping or trapping to) an interrupt handler or other software component (e.g., in a security module of the operating system) that is configured to determine whether the program instructions that triggered the interrupt are likely to be part of a timing side-channel attack and, if so, to mitigate the effects of the attack or curtail the attack. If it is determined that the program instructions that triggered the interrupt are likely to be part of a timing side-channel attack, shown as the positive exit from 240, the method may include taking action in an attempt to curtail the timing side-channel attack or mitigate its effects (as described herein), as in 250. For example, if an interrupt handler or security module determines that each (or at least some) of the cache line flush type instructions are followed by a corresponding read targeting the same memory area that was flushed (e.g., in a tight loop), or determines that cache line flush type instructions repeatedly and/or frequently target a particular shared physical memory page, the method may include modifying the program instructions or page mapping of the suspected attacking program, as described in more detail herein.

On the other hand, if it is determined that the program instructions that triggered the interrupt are not likely to be part of a timing side-channel attack, shown as the negative exit from 240, the method may include continuing execution of the application as is until or unless the performance monitor triggers another interrupt in response to detecting the execution of one or more additional cache line flush type instructions, at which point some or all of the operations illustrated in 220-250 may be repeated, as appropriate. This is illustrated in FIG. 2 by the path from the negative exit of 240 to 245 and then 220.

Note that the occurrence of cache line flush type instructions in a user application does not necessarily indicate that a timing side-channel attack is under way. For example, in various embodiments and systems, there may any number of legitimate uses for the cache line flush type instruction. For example, a system that includes a highly optimized application that is aware of its working set (e.g., it knows that it will not touch a particular area of memory again in the near future), and that also requires a high level or number of fast memory accesses may implement active management of its memory. In such embodiments, the application may start to flush some areas of memory from of the cache. In this scenario, the cache line flush type instructions used by the application may not repeatedly target the same memory lines. By contrast, an attacking program may repeatedly target the same few memory lines. Therefore, by inspecting the program instructions (e.g., a native-code representation of the program instructions, such as a binary code representation of the program instructions) in the neighborhood of the cache line flush type instructions (e.g., to determine the targeted locations and/or the frequency at which they are flushed and/or loaded), a security component may be able to determine whether or not an attack is likely under way. In other embodiments, a security component may be configured to observe the behavior of a suspected attacking program (e.g., one that includes cache line flush type instructions) over time to determine the locations and/or types of the memory areas that are targeted by the cache line flush type instructions over time. It some embodiments, it may not be necessary to prevent the attack (once suspected). Instead, the techniques described herein may be used in a honeypot type environment to monitor the behavior of various processes and/or applications and to build a database of suspicious programs or suspicious customers to be subsequently investigated or dealt with, rather than immediately taking action.

Figure 3:
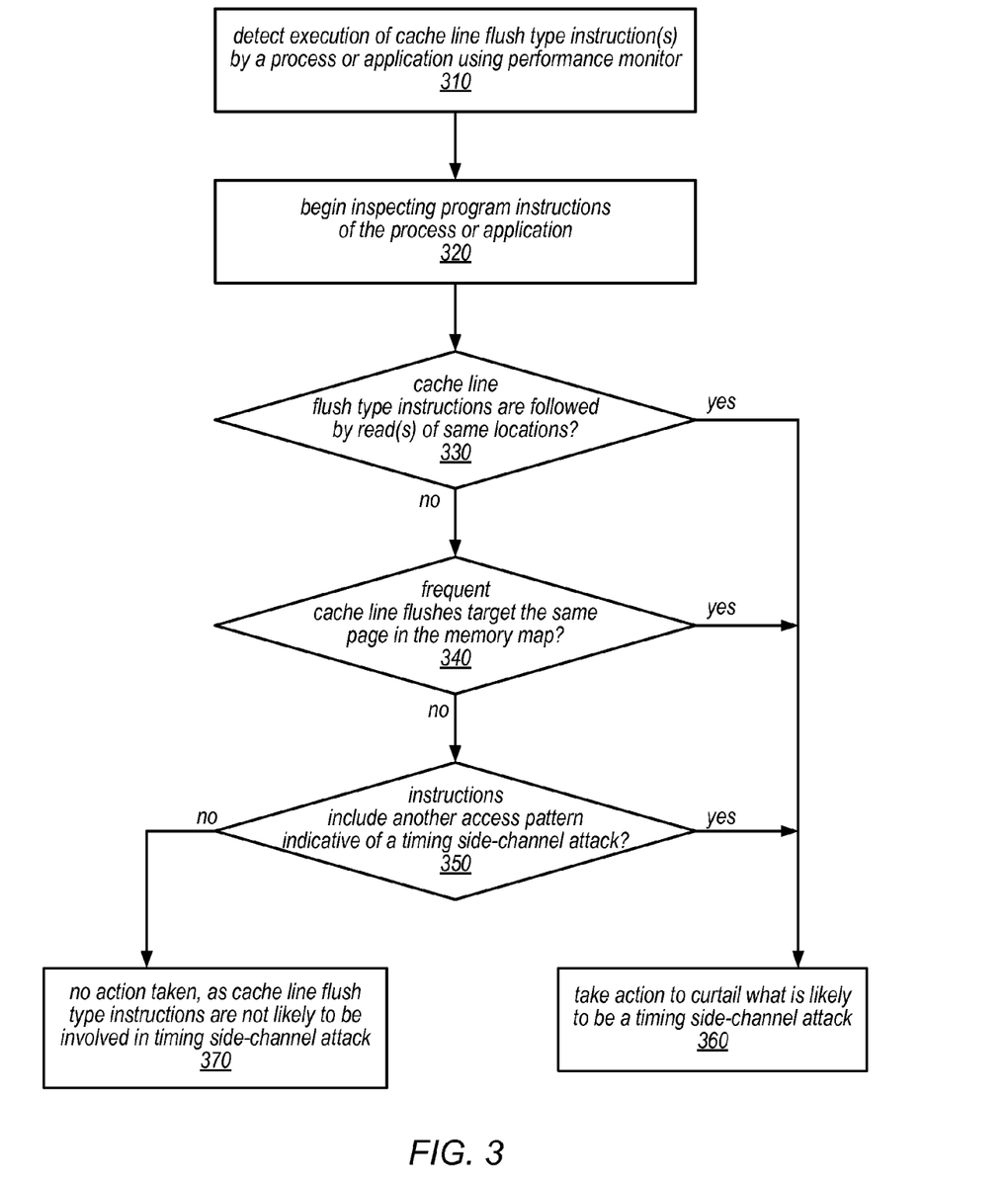
FIG. 3 is a flow diagram illustrating one embodiment of a method for determining whether a timing side-channel attack is in progress.

One embodiment of a method for determining whether a timing side-channel attack is in progress is illustrated by the flow diagram in FIG. 3. As illustrated at 310, in this example, the method may include detecting the execution of one or more cache line flush type instructions by a process or application using a performance monitor (e.g., a performance counter that is configured to trigger an interrupt after a pre-determined number of cache line flush type instructions have been executed or another hardware or software mechanism that directly or indirectly indicates when one or more cache line flush type operations has been execution). The method may then include beginning to inspect various program instructions of the process or application, e.g., program instructions in the neighborhood of the detected cache line flush type instruction(s), as in 320.

As illustrated in this example, if the detected cache line flush type instructions are followed by reads of the same locations (shown as the positive exit from 330), this may indicate that a timing side-channel attack is in progress. In this case, the method may include taking action to curtail what is likely to be a timing side-channel attack (or mitigate its effects), as in 360. For example, the method may include modifying the program instructions of the suspected attacker, as described in more detail below. Similarly, if it is determined that frequent and/or repeated cache line flush type instructions target the same page in the memory map (shown as the positive exit from 340), this may indicate that a timing side-channel attack is in progress. In this case, the method may also include taking action to curtail what is likely to be a timing side-channel attack, as in 360. For example, the method may include modifying the page mapping of the suspected attacker, as described in more detail below.

If neither of the conditions illustrated in 330 or 340 is detected, but the inspected program instructions include another access pattern that is indicative of a timing side-channel attack (e.g., as opposed to a legitimate use of cache line flush type instructions), shown as the positive exit from 350, the method may include taking action to curtail what may be a timing side-channel attack, as in 360. Otherwise, no action may be taken, as the detected cache line flush type instructions have not been found likely to be involved in timing side-channel attack, as in 370. As previously noted, in some embodiments, a security module in the operating environment or the hypervisor may be configured to perform the code inspection operations described herein. In some embodiments, hooks may be included in the code that drives the PMU under normal operation to establish special code for determining whether a timing side-channel attack is likely under way and for taking appropriate action, if so. For example, the special code (which may be invoked by an interrupt handler, in some embodiments) may be configured to first inspect the code of the suspected attacker (e.g., in the neighborhood of the cache line flush type instructions) and/or in the neighborhood of the locations that are being targeted by the cache line flush type instructions (e.g., in an observed or target application) to determine whether it is actually that case that the cache line flush instructions are being used in a manner that is in some way suspicious, and if so, to implement one of various available approaches to document or curtail the attack or to mitigate its effects. This may include applying one or more of the approaches described herein or taking any other approach that is appropriate in the particular context (e.g., the system environment, the targeted process, and/or other specific characteristics of the attack).

As noted above, one response to determining that a timing side-channel attack is likely under way may be to modify the program instructions of the (suspected) attacker. For example, in some embodiments, even when cache line flush type instructions are used in an application or process for legitimate purposes (e.g., for memory management), they may not be required for proper functioning (e.g., correctness) of the application or process. In such embodiments, a security component that is configured to detect, prevent, mitigate, and/or curtail such an attack may perform native-code patching of the program instructions of the suspected attacker to insert a replacement patch (e.g., binary code) from which one or more detected cache line flush type instructions has been removed. In other cases, removing the cache line flush type instructions may lead to correctness problems (e.g., if the suspected "attacker" is actually a guest kernel that manages page tables or similar data structures and relies on the cache lines to be flushed for correct execution). In such embodiments, a different approach may be employed in response to the execution of one or more cache line flush type instructions.

In some embodiments, rather than removing or disabling cache line flush type instructions in the program instructions of a suspected attacker, a security component that is configured to detect, prevent, mitigate, and/or curtail such an attack may be configured to modify the program instructions in a manner that results in predictable and consistent timing behavior for accesses to a portion of a shared memory that is targeted for removal from a cache by the detected cache line flush type instructions, thus closing what would otherwise constitute a timing side-channel through which information about a target (observed) process or application could flow. For example, in some embodiments, a security component that is configured to detect, prevent, mitigate, and/or curtail such an attack may perform native-code patching of the program instructions of the attacker to insert a replacement patch (e.g., binary code) in which one or more detected cache line flush type instructions (and, in some cases, other nearby instructions) have been replaced with native-code representations of one or more other (possibly similar) instructions that do not have any side effects, such as a no-operation (NOP) type instruction, or that at least do not cause any timing behaviors from which the attacker can infer information about a target/observed program. In other embodiments, the security component may be configured to insert a replacement patch (e.g., binary code) that includes the detected cache line flush type instructions but in which a read or load type instruction has been added immediately (or shortly) following each of the detected cache line flush type instructions to reload the flushed information back into the cache, or to insert a replacement patch (e.g., binary code) for each of the detected cache line flush type instructions that calls a sub-function that includes the detected cache line flush type instruction along with a read or load type instruction that immediately (or shortly) follows the cache line flush type instruction and reloads the flushed information back into the cache. In such embodiments, the suspected attacker may not observe any timing differences between accesses made prior executing a cache line flush type instruction and subsequent to executing the cache line flush type instruction, again resulting in closing the potential timing side-channel.

Note that in some embodiments, it may be difficult to insert a read or load type instruction (or sub-function call) into the program instructions of a suspected attacker following a cache line flush type instruction using native-code patching. For example, there may not be room within the patch area (e.g., within an area in the neighborhood of the cache line flush type instructions) to insert an additional read or load type instruction (or sub-function call) without changing the functionality of the program instructions, or the particular collection of program instructions in the patch area may be otherwise unsuitable for replacement with a patch of this type (due to the number and/or type of instructions that exist in the patch area or the location of the instruction boundaries within the patch area).

In some embodiments, a security component that is configured to detect, prevent, mitigate, and/or curtail such an attack may configure the program instructions of a suspected attacker to trap on the location of a cache line flush type instruction in the future by performing native-code patching of the program instructions of the attacker to insert a replacement patch (e.g., binary code) in which a detected cache line flush type instruction has been replaced with a native-code representation of a trap type instruction that, when encountered, triggers the invocation of a trap handler that emulates the detected cache line flush type instruction, or that elides the execution of the detected cache line flush type instruction. When emulating a detected cache line flush type instruction, a trap handler may execute the cache line flush, but before returning from the trap, may reload the targeted cache line(s) into the cache again so that the observer (e.g., a suspected attacker) never sees a timing difference. In other embodiments, a trap type instruction may be inserted immediately after a detected cache line flush type instruction, triggering invocation of a trap handler that reloads the targeted cache line(s) into the cache again so that the observer (e.g., a suspected attacker) never sees a timing difference.

In some embodiments, a security component that is configured to detect, prevent, mitigate, and/or curtail such an attack may be configured to cause a suspected attacker to trap on the location of a cache line flush type instruction in the future by removing the page mapping (e.g., at the hypervisor level) for the specific physical memory page on which the cache line flush type instruction resides. In such embodiments, each time the page on which the cache line flush type instruction resides is encountered, this may trigger a page fault, after which the program instructions on this page may be emulated. Again, during emulation, execution of the cache line flush type instruction may be elided or a read or load type operation may be executed following the cache line flush type instruction to reload the targeted cache line(s) into the cache again (e.g., to re-populate the cache hierarchy with the previously flushed information) so that an observer (e.g., a suspected attacker) never sees a timing difference. This approach may be suitable for use in embodiments in which the suspected attacker is (or could be) monitoring its own code pages to determine whether the code has been modified.

As previously noted, in some embodiments, one or more of the techniques described herein may mitigate the effects of a suspected timing side-channel attack by slowing down its execution. For example, execution of a cache line flush type instruction of a suspected attacker may be slowed down (e.g., rate-limited) by instrumenting the page on which the cache line flush type instruction is resident and by setting the corresponding page to faulting, which will allow future emulation via synchronous page faults. In another example, the negative timing effect of a cache line flush type instruction may be prevented by emulating the instruction in such a way that the targeted cache line is flushed but is then immediately reloaded afterwards by a load type instruction targeting the same address(es). In either case, the attacker may never see an actual timing difference but any correctness requirement of executing the cache line flush type instruction may be fulfilled.

Figure 4:
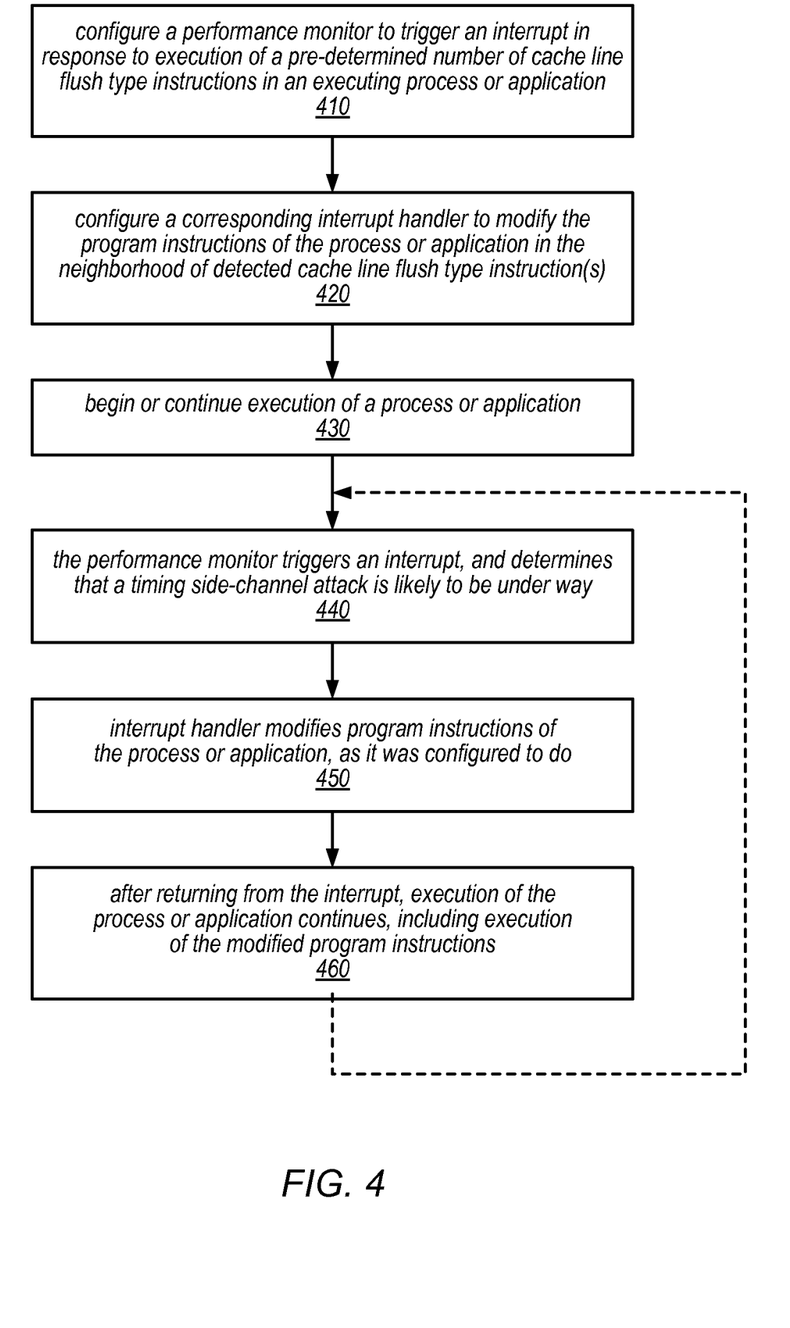
FIG. 4 is a flow diagram illustrating one embodiment of a method for detecting, preventing, mitigating, and/or curtailing a timing side-channel attack that includes modifying the program instructions of an attacking process or application.

One embodiment of a method for employing the techniques described herein to detect, prevent, mitigate, and/or curtail a timing side-channel attack is illustrated by the flow diagram in FIG. 4. As illustrated at 410, in this example, the method may include configuring a performance monitor (e.g., a performance counter) to trigger an interrupt in response to execution of a pre-determined number of cache line flush type instructions in an executing process or application. For example, the method may include configuring a performance monitor to emulate a trap on cache line flush type instructions, as described herein. As illustrated in this example, the method may also include configuring a corresponding interrupt handler to modify the program instructions of the process or application in the neighborhood of detected cache line flush type instruction(s), as in 420. For example, the method may include inserting a replacement patch in the native-code representation of the program instructions and/or configuring emulation code to be executed in place of at least some of the original code in response to the interrupt, in different embodiments. In various embodiments, modifying the program instructions may include replacing at least one cache line flush type instruction in the program instructions with another type of instruction (e.g., an instruction without timing side effects, a trap type instruction, or another type of instruction), inserting an instruction immediately or shortly before at least one cache line flush type instruction in the program instructions, or inserting an instruction (e.g., a read or load type instruction) immediately or shortly after at least one cache line flush type instruction in the program instructions.

As illustrated in this example, the method may include beginning or continuing execution of a process or application, as in 430. For example, the process or application that includes the detected cache line flush type instructions may be executed substantially concurrently with operation of the performance monitor (which may be implemented using any combination of hardware and/or software mechanism, in different embodiments) and/or a security module that is configured to detect, prevent, mitigate, and/or curtail timing side-channel attacks. In this example, at some point during execution of the process or application the performance monitor (or security module) may trigger an interrupt, and may determine that a timing side-channel attack is likely to be under way (as in 440). In response to determining that a timing side-channel attack is likely to be under way, the method may include the interrupt handler modifying the program instructions of the process or application, as it was configured to do (as in 450). As illustrated in this example, after returning from the interrupt, the method may include continuing the execution of the process or application, which may include execution of the modified program instructions (as in 460). As described herein, the modification of the program instructions may curtail or mitigate the effects of the timing side-channel attack, in some embodiments.

Note that, in this example, even after the program instructions are modified, the performance monitor may detect the execution of additional cache line flush type instructions (some of which may be indicative of a timing side-channel attack, and others of which may not be indicative of a timing side-channel attack). This is illustrated in FIG. 4 by the feedback from 460 to 440. If the additional cache line flush type instructions are determined to be indicative of a timing side-channel attack, the method may include the interrupt handler making further modifications to the program instructions of the process or application (e.g., in the same shared memory area or in another shared memory area) and then continuing execution of the process or application (which may include executing the further modified program instructions).

As previously noted, in some embodiments, the systems described herein may be configured to emulate guest code on a particular a page in memory that includes one or more cache line flush type instructions. For example, in the hypervisor, a single entry may be removed from the page table of the guest and whenever the guest process or application starts to access memory on that page (e.g., to execute instructions on that page) this will cause a trap at the hypervisor. In such embodiments, for each such trap, the hypervisor (or a security component thereof) may inspect the underlying page to determine what the code is there, emulate a single instruction and then return to the guest, letting the guest fault again until and unless the guest is finished executing on the page. In some embodiments, this approach may slow down execution of the code on that page of the suspected attacker's program, which may be sufficient to mitigate the effects of the attack.

In some embodiments, one approach that may be employed in preventing a timing side-channel attack is to disable page de-duplication in the operating environment entirely. However, for virtualized environments, page de-duplication may be a legitimate and useful thing to do. Some hypervisors may perform page de-duplication by default, and in such embodiments it may be difficult (or tricky) to disable it fully. For example, if multiple virtual machines are started based on an image on disk, and if the image is the same base image, there may already be many pages shared between them without the hypervisor doing anything. Note that in some operating systems, it may not be possible to be sure whether an underlying hypervisor is disabling page de-duplication only for particular pages or for the entire shared memory system unless this feature can be completely controlled in a manner that is visible to a security module or another privileged user process. Similarly, on a local machine, it may be extremely impractical (and/or prohibitively costly in terms of time and/or resources) to disable page de-duplication. For example, disabling page de-duplication may mean that each application executing on the local machine may require much more memory, and application startup may be very slow because of the need to load all of the shared libraries for each application.

In some embodiments, an underlying page targeted by one or more cache line flush type instructions may be "de-de-duplicated" (e.g., its de-duplication may be disabled) by a security module (e.g., a security module within the hypervisor) in response to detection of a first cache line flush that targets the page, thus rendering the attack obsolete. In some embodiments, the page may be marked (e.g., by the security module) as a potential target for timing side-channel attacks, which may prevent future attempts to de-duplicate the page from taking place (or succeeding). For example, a hypervisor may typically scan all of the pages in shared memory, build a database of signatures and, whenever it sees two (or more) similar pages, merge them. However, the hypervisor must also be able to un-merge the similar pages whenever one of the programs (e.g., guests) starts to modify them (e.g., to change one of them so that they are no longer similar) using a copy-on-write type feature. Note that cache line flush type instructions may not be anything to worry about when the underlying targeted page is just a single physical page in memory that is not shared. However, if the security module determines that a process or application is executing a large number of cache line flush type instructions and that they are targeting (or attempting to target) de-duplicated pages, the security module may be configured to start to prevent an attack by providing a second copy of those pages. In some embodiments, at the operating system level, for example, if a certain module in the kernel (e.g., a security module thereof) determines that a particular program is likely an attacker, it may be configured to make a private copy of what would otherwise be shared library for the use of the attacker. In some embodiments, during emulation of a portion of the program instructions of an attacker that includes one or more cache line flush type instructions (as described herein) the emulation code may undo and/or disable page de-duplication for a page that is targeted by a cache line flush type instruction. In such embodiments, the attacker will operate on its own copy of the targeted pages and will never see any effects of the attempted attack.

Figure 5:
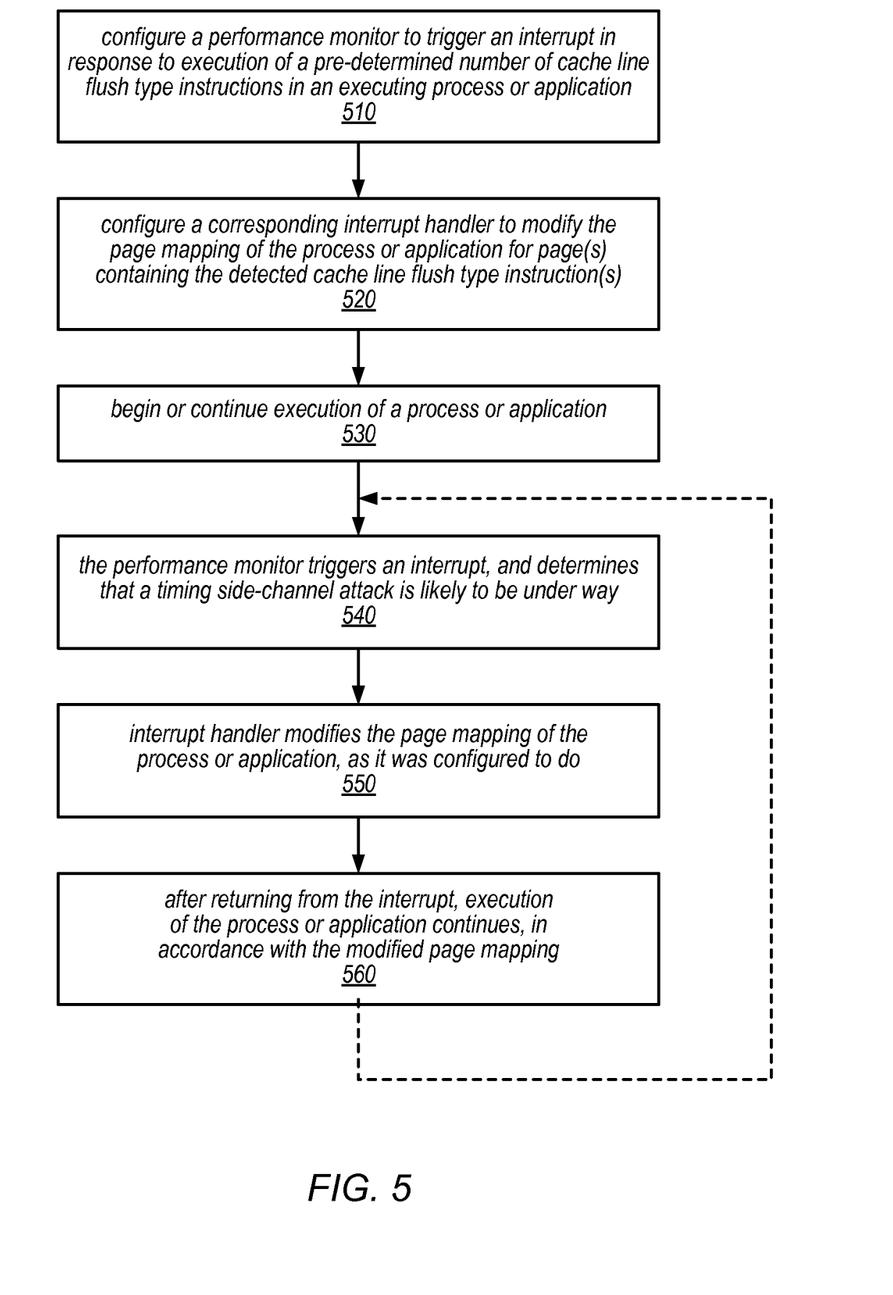
FIG. 5 is a flow diagram illustrating one embodiment of a method for detecting, preventing, mitigating, and/or curtailing a timing side-channel attack that includes modifying the page mapping of an attacking process or application.

Another embodiment of a method for employing the techniques described herein to detect, prevent, mitigate, and/or curtail a timing side-channel attack is illustrated by the flow diagram in FIG. 5. As in the previous example, the method may include configuring a performance monitor (e.g., a performance counter) to trigger an interrupt in response to execution of a pre-determined number of cache line flush type instructions in an executing process or application, as in 510. For example, the method may include configuring a performance monitor to emulate a trap on cache line flush type instructions, as described herein. As illustrated in this example, the method may also include configuring a corresponding interrupt handler to modify the page mapping of the process or application for the page (or pages) containing the detected cache line flush type instruction(s), as in 520. For example, the interrupt handler may be configured to disable de-duplication for a page in shared memory, or to remove one or more entries of a page mapping table (or otherwise modify one or more entries of the page mapping table) to cause a page fault when a suspected attacker subsequently accesses that page.

As illustrated in this example, the method may include beginning or continuing execution of a process or application, as in 530. For example, the process or application that includes the detected cache line flush type instructions may be executed substantially concurrently with operation of the performance monitor (which may be implemented using any combination of hardware and/or software mechanism, in different embodiments) and/or a security module that is configured to detect, prevent, mitigate, and/or curtail timing side-channel attacks. As in the previous example, at some point during execution of the process or application the performance monitor (or security module) may trigger an interrupt, and may determine that a timing side-channel attack is likely to be under way (as in 540). In response to determining that a timing side-channel attack is likely to be under way, the method may include the interrupt handler modifying the page mapping of the process or application, as it was configured to do (as in 550). As illustrated in this example, after returning from the interrupt, the method may include continuing the execution of the process or application in accordance with the modified page mapping (as in 560). As described herein, the modification of the program instructions may curtail or mitigate the effects of the timing side-channel attack, in some embodiments.

Note that, in this example, even after the page mapping has been modified, the performance monitor may detect the execution of additional cache line flush type instructions (some of which may be indicative of a timing side-channel attack, and others of which may not be indicative of a timing side-channel attack). This is illustrated in FIG. 5 by the feedback from 560 to 540. If the additional cache line flush type instructions are determined to be indicative of a timing side-channel attack, the method may include the interrupt handler making further modifications to the page mapping of the process or application and then continuing execution of the process or application, according to the further modified page mapping.

Note that several example embodiments of the techniques described herein for determining whether a timing side-channel attack is underway and/or for mitigating and/or curtailing such an attack include configuring a performance monitor (e.g., a performance counter) to trigger an interrupt in response to execution of a pre-determined number of cache line flush type instructions in an executing process or application and configuring a corresponding interrupt handler to inspect and/or modify the program instructions of the process or application in the neighborhood of any detected cache line flush type instruction(s). However, in other embodiments, other mechanisms (including, but not limited to, various hardware or software breakpoint mechanisms) may be used to intercept cache line flush type instructions and redirect execution to an exception or event handler in order to determine whether a timing side-channel attack is underway, or to mitigate and/or curtail such an attack.

In some embodiments, the CPUs or PMUs of the systems described herein may include hardware support for setting breakpoints (e.g., for use in debugging exercises or for other purposes). For example, in some CPU architectures, the processors include one or more dedicated special purpose registers (sometimes referred to as debug registers), each of which may be programmed with a breakpoint address. In such architectures, when an address that is programmed into one of these registers is read, written to, and/or executed, an exception may be triggered, in response to which control may be passed to a debugger or to another type of exception or event handler. In some embodiments, in order to intercept cache line flush type instructions in an executing process or application (e.g., following the detection of a suspicious cache line flush type instruction in the executing process or application), a first exception handler (e.g., one invoked in response to detecting the suspicious cache line flush type instruction) may set a hardware breakpoint at the address of the suspicious cache line flush type instruction. In such embodiments, when and if execution of the process or application returns to that point in the program instructions, the breakpoint will be triggered and execution of the process or application will be directed elsewhere (e.g., to an exception or event handler for the hardware breakpoint that is configured to determine whether a timing side-channel attack is underway, or to mitigate and/or curtail such an attack, as described herein).

Similarly, in some embodiments, in order to intercept cache line flush type instructions in an executing process or application (e.g., following the detection of a suspicious cache line flush type instruction in the executing process or application), a first exception handler (e.g., one invoked in response to detecting the suspicious cache line flush type instruction) may set a software breakpoint at the address of the suspicious cache line flush type instruction. For example, in response to detection of the suspicious cache line flush type instruction, the first exception handler may be configured to replace the suspicious cache line flush type instruction with a dedicated software breakpoint instruction (if such an instruction is supported in the instruction set architecture) or with an illegal or undefined instruction encoding, any of which, when encountered during execution of the process or application will trigger a software breakpoint type exception. In such embodiments, when and if execution of the process or application returns to that point in the program instructions, the software breakpoint type exception will be triggered and execution of the process or application will be directed elsewhere (e.g., to an exception or event handler for the software breakpoint type exception that is configured to determine whether a timing side-channel attack is underway, or to mitigate and/or curtail such an attack, as described herein).

Note that in different embodiments, various combinations of the techniques described herein for preventing, mitigating and/or curtailing a timing side-channel attack may be employed in response to determining that a timing side-channel attack is likely under way. For example, in some embodiments a security module of an operating system or hypervisor, a trap handler, an interrupt handler, or another type of exception or event handler (e.g., a breakpoint handler) may be configured to modify both the program instructions and the page mapping of a suspected attacker one or more times (e.g., modifying different portions of the code and/or modifying the page mapping of different pages each time) in response to determining that a timing side-channel attack is likely under way. In other embodiments, a security module of an operating system or hypervisor, a trap handler, an interrupt handler, or another type of exception or event handler (e.g., a breakpoint handler) may be configured to first modify the program instructions of a suspected attacker one or more times (e.g., modifying different portions of the code each time) in response to determining that a timing side-channel attack is likely under way, and to subsequently modify the page mapping of one or more pages of the suspected attacker (e.g., modifying the page mapping for one shared memory area and then another), or vice versa, if the first attempt(s) to prevent, mitigate and/or curtail the suspected attack are not sufficient.

As previously noted, a timing side-channel attack may be carried out (or attempted) in a virtualized computing environment in which there may be many instances of virtualized computing resources executing on behalf of guests. In some embodiments, the techniques described herein may be employed as a security feature of the virtualized computing system (e.g., by a security module of a hypervisor or virtual machine monitor in the system). In some embodiments, these techniques may be employed in a cloud computing environment in which multiple customers may share virtualized computing resources and/or storage resources on a single physical machine to detect, prevent, mitigate, and/or curtail a timing side channel attack. For example, in systems in which shared logins are provided on physical machines, a customer may be able to load malicious code onto an individual user's machine that could potentially carry out this type of attack, and the techniques described herein may be employed in response to detection of the attack.

Figure 6:
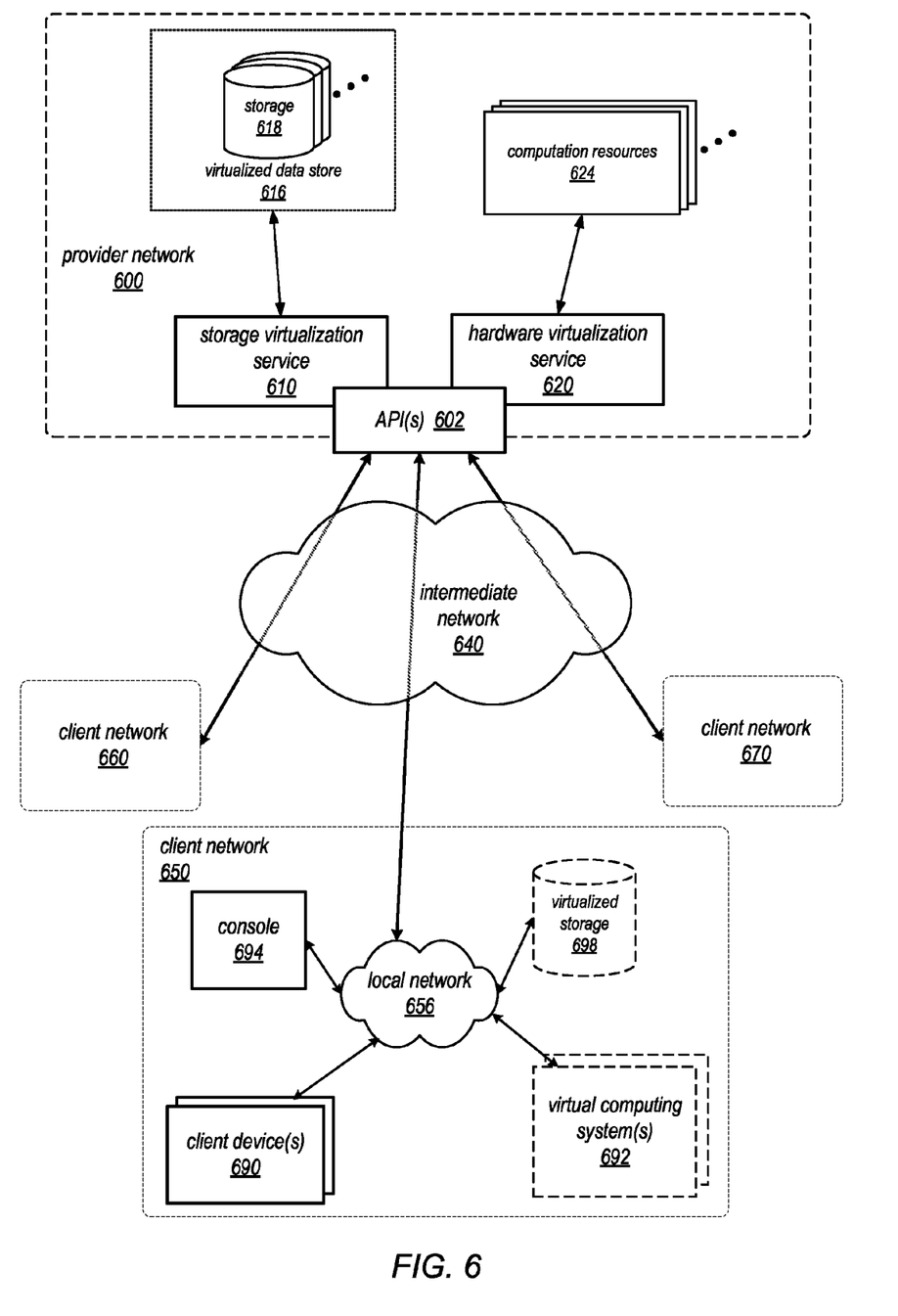
FIG. 6 is a block diagram illustrating an example provider network environment in which the techniques described herein for detecting, preventing, mitigating, and/or curtailing timing side-channel attacks may be employed, according to at least some embodiments.

FIG. 6 is a block diagram illustrating an example provider network environment in which the techniques described herein for detecting, preventing, mitigating, and/or curtailing timing side-channel attacks may be employed, according to at least some embodiments. In this example, the provider network environment 600 provides a storage virtualization service and a hardware virtualization service to clients. In this example, hardware virtualization service 620 provides multiple computation resources 624 (e.g., VMs) to clients. The computation resources 624 may, for example, be rented or leased to clients of the provider network 600 (e.g., to a client that implements client network 650, client network 660, and/or client network 670) in order to implement various applications, which may include observer (e.g., attacking) applications and/or observed (e.g., target) applications. Each computation resource 624 may be provided with one or more private IP addresses. Provider network 600 may be configured to route packets from the private IP addresses of the computation resources 624 to public Internet destinations, and from public Internet sources to the computation resources 624.

Provider network 600 may provide a client network (e.g., client network 650, 660, or 670) coupled to intermediate network 640 via local network 656) the ability to implement virtual computing systems 692 via hardware virtualization service 620 coupled to intermediate network 640 and to provider network 600. Note that in some embodiments, each of client networks 660 and 670 may include elements that are similar to corresponding elements of client network 650 (not shown) and may provide functionality similar to that of client network 650, while in other embodiments, client network 660 and/or 670 may include more, fewer, or different elements than those illustrated in FIG. 6 as being part of client network 650 and/or may provide functionality that is different than that of client network 650. In some embodiments, hardware virtualization service 620 may provide one or more APIs 602, for example a web services interface, via which a client network 650, 660, or 670 may access functionality provided by the hardware virtualization service 620 via a console such as console 694. In at least some embodiments, at the provider network 600, each virtual computing system at a client network (e.g., a virtual computing system 692 at client network 650) may correspond to a computation resource 624 that is leased, rented, or otherwise provided to the client network.

In this example, from an instance of a virtual computing system 692 and/or another client device 690 or console 694 of a client network 650, 660, or 670, a client may access the functionality of storage virtualization service 610, for example via one or more APIs 602, to access data from and store data to a virtual data store 616 provided by the provider network 600. In some embodiments, a virtualized data store gateway (not shown) may be provided at the client network (e.g., at client network 650, 660, or 670) that may locally cache at least some data, for example frequently accessed or critical data, and that may communicate with storage virtualization service 610 via one or more communications channels to upload new or modified data from a local cache so that the primary store of data (virtualized data store 616) is maintained. In at least some embodiments, a user, via a virtual computing system 692 and/or on another client device 690, may mount and access one or more storage volumes 618 of virtual data store 616, each of which appears to the user as local virtualized storage 698.

Figure 7:
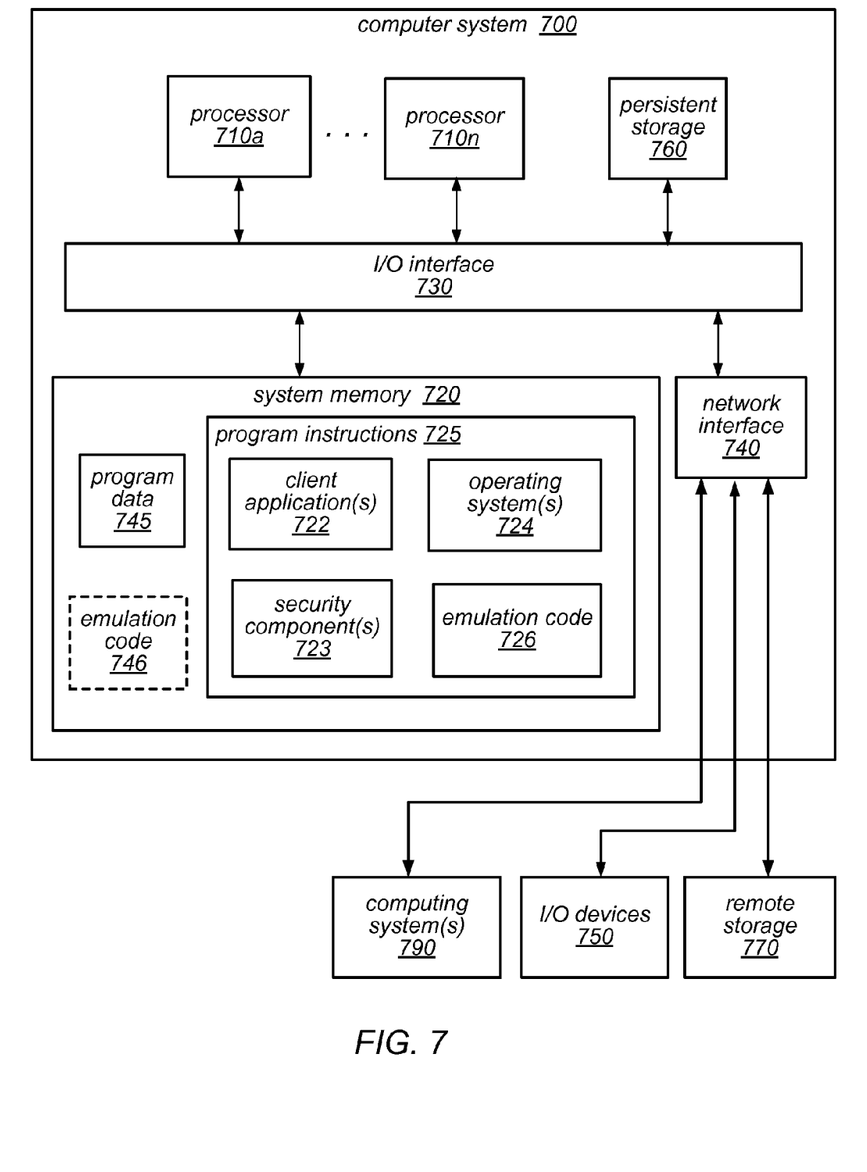
FIG. 7 is a block diagram illustrating a computer system configured to implement the techniques described herein, according to various embodiments.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement any or all of the functionality described herein for detecting, preventing, mitigating, and/or curtailing timing side-channel attacks. FIG. 7 is a block diagram illustrating a computer system configured to implement the techniques described herein, according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Note that computer system 700 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein.

Computer system 700 includes one or more processors 710 (any of which may include multiple cores, which may be single or multi-threaded) coupled to a system memory 720 via an input/output (I/O) interface 730. Note that while several examples described herein are directed to systems in which the processors implement an x86 instruction set, the techniques described herein are not limited to such embodiments. Computer system 700 further includes a network interface 740 coupled to I/O interface 730. In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. The computer system 700 also includes one or more network communication devices (e.g., network interface 740) for communicating with other systems and/or components over a communications network (e.g. Internet, LAN, etc.). For example, a client application executing on system 700 may use network interface 740 to communicate with a server application executing on a single server or on a cluster of servers that implement a distributed system. In another example, an instance of a server application executing on computer system 700 may use network interface 740 to communicate with a client application and/or with other instances of the server application that may be implemented on other computer systems.

In the illustrated embodiment, computer system 700 also includes one or more persistent storage devices 760. In various embodiments, persistent storage devices 760 may correspond to disk drives, tape drives, solid state memory, other mass storage devices, or any other persistent storage device. Computer system 700 (or an application, software component, or operating system operating thereon) may store instructions and/or data in persistent storage devices 760, as desired, and may retrieve the stored instruction and/or data as needed.

Computer system 700 includes one or more system memories 720 that are configured to store instructions and data accessible by processor 710. In various embodiments, system memories 720 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 720 may contain program instructions 725 that are executable by processor(s) 710 to implement the methods and techniques described herein for detecting, preventing, mitigating, and/or curtailing timing side-channel attacks, e.g., configuring a performance monitor or breakpoint mechanism to emulate trapping on a cache line flush type instruction; configuring a trap handler, an interrupt handler, or another type of exception or event handler (e.g., a breakpoint handler) to inspect program instructions of a process or application that executes a pre-determined number of cache line flush type instructions or triggers a breakpoint, or to mitigate or curtail a suspected timing side-channel attack by inspecting program instructions in the neighborhood of the detected cache line flush type instructions, and/or modifying the program code and/or page mapping of a process or application if it is suspected of carrying out a timing side-channel attack. In various embodiments, program instructions 725 may be encoded in platform native binary, any interpreted language such as Java™ byte-code, or in any other language such as C/C++, Java™, etc., or in any combination thereof. For example, in the illustrated embodiment, program instructions 725 include program instructions executable to implement one or more client application(s) 722 (which may include observer programs that carry out, or attempt to carry out, timing side-channel attacks and/or observed applications that may be targeted by a timing side-channel attack), various security component(s) 723, emulation code 726, and/or operating system(s) 724, which may include or be implemented as a hypervisor or virtual machine monitor, or any of various operating systems, such as UNIX, LINUX, Solaris™, MacOS™, Windows™, etc. Note also that in various embodiments, a security component 723 may be implemented as a component of an operating system 724, in some embodiments.

Note that in various embodiments, some or all of system memory 710 (including some or all of program instructions 725 and/or program data 745) may be implemented within shared physical memory pages in a stand-alone computing system or in a system provides virtualized resources to clients, as described herein. Note also that in some embodiments, emulation code 746 may be loaded into a portion of system memory 720 other that the portion of system memory 720 that includes program instructions 725 in order to emulate program instructions of a suspected attacker and/or may include a private copy of a shared library (or a portion thereof) for the use of a suspected attacker following de-duplication or shared pages or a remapping of the pages of the suspected attacker.

Any or all of program instructions 725, including client application(s) 722, security component(s) 723, emulation code 726, emulation code 746, and/or operating system(s) 724, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 740.

In some embodiments, system memory 720 may include storage for program data 745 and/or for emulation code 746, as described herein. In various embodiments, system memory 720 (e.g., program data 745 within system memory 720) and/or remote storage 770 may store information about suspected attacks or suspicious clients, customers, or programs, code path information or branch histories, performance monitor data (such as data from one or more hardware or software performance counters), and/or any other information usable in implementing the methods and techniques described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as other computer systems 790 (which may implement one or more server nodes and/or clients of a distributed system), for example. In addition, network interface 740 may be configured to allow communication between computer system 700 and various I/O devices 750 and/or remote storage 770. Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol. In various embodiments, computer system 700 may include more, fewer, or different components than those illustrated in FIG. 7 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
configuring a performance monitor to emulate trapping on a cache line flush type instruction, wherein said configuring comprises configuring a hardware performance counter to trigger an interrupt after a pre-determined number of cache line flush type instructions have been executed;
in response to the hardware performance counter triggering an interrupt after the pre-determined number of cache line flush type instructions have been executed:
inspecting program instructions of an executing process or application that includes the cache line flush type instructions;
determining, dependent at least in part on said inspecting, whether the cache line flush type instructions are being employed within a timing side-channel attack; and
in response to determining that the cache line flush type instructions are being employed within a timing side-channel attack, taking action to curtail the timing side-channel attack, wherein said taking action comprises modifying the program instructions or page mapping of the executing process or application that includes the cache line flush type instructions.

2. The method of claim 1, wherein said determining comprises determining that each of the cache line flush type instructions is followed closely by a read type instruction targeting at least a portion of a memory area targeted by the cache line flush type instruction or determining that multiple ones of the cache line flush type instructions target at least a portion of the same page in memory.

3. The method of claim 1, wherein said modifying comprises replacing at least one cache line flush type instruction in the program instructions with another type of instruction, inserting an instruction before at least one cache line flush type instruction in the program instructions, or inserting an instruction after at least one cache line flush type instruction in the program instructions.

4. The method of claim 1, wherein at least one of said inspecting, said determining, or said taking action is performed by a component of an operating system, a hypervisor, or a virtual machine monitor.

5. A system, comprising:
one or more processors, wherein the one or more processors comprise a performance counter configured to detect execution of cache line flush type instructions of the one or more processors; and
a memory coupled to the one or more processors;
wherein the memory stores program instructions executable by the one or more processors to implement at least a portion of an application;
wherein the memory stores program instructions executable by the one or more processors to implement a security component; and
wherein in response to detection by the performance counter that one or more cache line flush type instructions of the one or more processors have been executed by the at least a portion of an application, the security component is configured to:
inspect program instructions of the at least a portion of an application; and
determine, dependent at least in part on the inspection, whether the cache line flush type instructions are part of a timing side-channel attack being carried out by the at least a portion of an application.

6. The system of claim 5, wherein prior to the performance counter detecting that one or more cache line flush type instructions have been executed by the at least a portion of an application, the security component is configured to: configure the performance counter to trigger an interrupt in response to the execution of a pre-determined number of cache line flush type instructions.

7. The system of claim 5, wherein to determine whether the cache line flush type instructions are likely part of a timing side-channel attack being carried out by the at least a portion of an application, the security component is configured to determine that at least one of the one or more cache line flush type instructions is followed closely by a read type instruction targeting at least a portion of a memory area targeted by the cache line flush type instruction or to determine that multiple ones of the one or more cache line flush type instructions target at least a portion of the same page in memory.

8. The system of claim 5, wherein in response to a determination that the cache line flush type instructions are part of a timing side-channel attack being carried out by the at least a portion of an application, the security component is further configured to take action to mitigate or curtail the timing side-channel attack.

9. The system of claim 8, wherein to take action to mitigate or curtail the timing side-channel attack, the security component is configured to modify the program instructions of the at least a portion of an application in a manner that results in predictable and consistent timing behavior for accesses to a portion of a shared memory that is targeted for removal from a cache by at least one of the one or more cache line flush type instructions.

10. The system of claim 8, wherein to take action to mitigate or curtail the timing side-channel attack, the security component is configured to replace a cache line flush type instruction in the program instructions of the at least a portion of an application with one or more program instructions configured to redirect execution to a sequence of program instructions that implement the cache line flush type instruction and a load type instruction that accesses a portion of a shared memory that is targeted for removal from a cache by the cache line flush type instruction.

11. The system of claim 8, wherein to take action to mitigate or curtail the timing side-channel attack, the security component is configured to:
replace a cache line flush type instruction in the program instructions of the at least a portion of an application with a trap type instruction whose execution triggers execution of a trap handler;
set a software breakpoint for one of the cache line flush type instructions, wherein to set the software breakpoint, the security component is configured to replace the cache line flush type instruction in the program instructions of the at least a portion of an application with an instruction whose execution triggers execution of an exception handler for the software breakpoint; or
set a hardware breakpoint for one of the cache line flush type instructions, wherein to set the hardware breakpoint, the security component is configured to program a hardware register with an address of the cache line flush type instruction in the program instructions such that accesses targeting the programmed address trigger execution of an exception handler for the hardware breakpoint.

12. The system of claim 8, wherein to take action to mitigate or curtail the timing side-channel attack, the security component is configured to remove a cache line flush type instruction in the program instructions of the at least a portion of an application or replace a cache line flush type instruction in the program instructions of the at least a portion of an application with an instruction that has no side effects.

13. The system of claim 8, wherein to take action to mitigate or curtail the timing side-channel attack, the security component is configured to:
   insert a trap type instruction in the program instructions of the at least a portion of an application immediately before at least one of the cache line flush type instructions, wherein execution of the trap type instruction triggers execution of a trap handler;
   set a software breakpoint, wherein to set the software breakpoint, the security component is configured to insert an instruction whose execution triggers execution of an exception handler for the software breakpoint in the program instructions of the at least a portion of an application immediately before one of the cache line flush type instructions; or
   set a hardware breakpoint, wherein to set the hardware breakpoint, the security component is configured to program a hardware register with an address of an instruction that immediately precedes one of the cache line flush type instructions in the program instructions such that accesses targeting the programmed address trigger execution of an exception handler for the hardware breakpoint.

14. The system of claim 8, wherein to take action to mitigate or curtail the timing side-channel attack, the security component is configured to insert a load type instruction that accesses a portion of a shared memory targeted by one of the cache line flush type instructions in the program instructions of the at least a portion of an application immediately following the one of the cache line flush type instructions.

15. The system of claim 8, wherein to take action to mitigate or curtail the timing side-channel attack, the security component is configured to modify the page mapping of the at least a portion of an application such that accesses to a memory page that comprises at least one of the cache line flush type instructions result in a page fault.

16. The system of claim 8, wherein to take action to mitigate or curtail the timing side-channel attack, the security component is configured to disable de-duplication of a shared memory page targeted by at least one of the cache line flush type instructions.

17. A non-transitory computer-readable storage medium storing program instructions that when executed on one or more computers cause the one or more computers to perform:
   determining, dependent at least in part on an indication received from a performance monitor, that one or more cache line flushes performed by an executing application are part of a timing side-channel attack being carried out by the executing application; and
   in response to determining that the one or more cache line flushes are part of a timing side-channel attack, taking action to curtail the timing side-channel attack, wherein said taking action comprises modifying instructions of the executing application or page mapping of the executing application.

18. The non-transitory computer-readable storage medium of claim 17, wherein said determining comprises detecting that an interrupt was triggered by the performance monitor in response to a pre-determined number of cache line flushes being performed by the executing application.

19. The non-transitory computer-readable storage medium of claim 17, wherein said determining comprises:
   inspecting program instructions of the executing application; and
   determining that at least one of the one or more cache line flushes is followed closely by a load operation targeting at least a portion of a memory area targeted by the at least one cache line flush or determining that multiple ones of the one or more cache line flushes target at least a portion of the same page in memory.

\* \* \* \* \*